United States Patent
Konka et al.

(10) Patent No.: US 10,542,484 B1
(45) Date of Patent: Jan. 21, 2020

(54) APPARATUS AND METHOD FOR ESTABLISHING WIFI ACCESS POINT HANDSHAKE PRIORITIES

(71) Applicant: Ipass Inc., Redwood City, CA (US)

(72) Inventors: Raghu Konka, Pleasanton, CA (US); Tomasz Magdanski, Redwood City, CA (US); Purushottam Shukla, Belmont, CA (US); Navtej Singh Mann, Fremont, CA (US)

(73) Assignee: Ipass IP LLC, Redwood Shores, CA (US)

( * ) Notice: Subject to any disclaimer, the term of this patent is extended or adjusted under 35 U.S.C. 154(b) by 61 days.

(21) Appl. No.: 15/885,589

(22) Filed: Jan. 31, 2018

(51) Int. Cl.
| | |
|---|---|
| *H04W 48/16* | (2009.01) |
| *H04W 48/14* | (2009.01) |
| *H04W 76/19* | (2018.01) |
| *H04W 8/00* | (2009.01) |
| *H04W 52/02* | (2009.01) |

(52) U.S. Cl.
CPC .......... *H04W 48/16* (2013.01); *H04W 8/005* (2013.01); *H04W 48/14* (2013.01); *H04W 52/0229* (2013.01); *H04W 76/19* (2018.02)

(58) Field of Classification Search
CPC .......... H04W 8/005; H04W 12/00516; H04W 48/14; H04W 48/16; H04W 76/19
See application file for complete search history.

(56) References Cited

U.S. PATENT DOCUMENTS

| | | | |
|---|---|---|---|
| 2009/0111466 A1* | 4/2009 | Montemurro | H04W 48/16 455/434 |
| 2014/0092886 A1* | 4/2014 | Gupta | H04W 4/70 370/338 |
| 2016/0119862 A1* | 4/2016 | Rinne | H04W 36/14 455/434 |
| 2016/0286341 A1* | 9/2016 | Lee | H04W 76/14 |
| 2017/0135019 A1* | 5/2017 | Vamaraju | H04W 36/30 |
| 2017/0201938 A1* | 7/2017 | Kim | H04W 48/20 |
| 2018/0359764 A1* | 12/2018 | Ong | H04L 12/4625 |
| 2019/0130019 A1* | 5/2019 | De | H04L 61/6022 |

* cited by examiner

*Primary Examiner* — Marcus Smith
(74) *Attorney, Agent, or Firm* — Cooley LLP

(57) ABSTRACT

A server has a processor and a memory connected to the processor. The memory stores instructions executed by the processor to collect scan lists from client devices. Each scan list includes individual entries. Each individual entry specifies a WiFi access point network identifier collected by a client. WiFi access point networks in the scan lists are evaluated. WiFi access point handshake priorities are supplied to the client devices. The WiFi access point handshake priorities characterize WiFi access point recovery and discovery priorities.

4 Claims, 3 Drawing Sheets

APPARATUS AND METHOD FOR ESTABLISHING WIFI ACCESS POINT HANDSHAKE PRIORITIES

FIELD OF THE INVENTION

This invention relates generally to WiFi networks. More particularly, this invention relates to techniques for establishing WiFi access point handshake priorities.

BACKGROUND OF THE INVENTION

WiFi is a technology that allows electronic devices to connect to a wireless local area network (WLAN) through an access point. The term WAP is used herein to denote a WiFi access point. WAP connections are commonly free and therefore there is a growing interest in connecting to WAPs as often as possible.

iPass, Inc., Redwood Shores, Calif., the assignee of this patent application, offers services to help users navigate WiFi networks. This is advantageous because Win networks may behave differently at different times. For example, a known WiFi network may shut down or may stop supporting a particular service. The process of detecting a known WiFi network returning to service is referred to herein as recovery.

New WiFi networks become available every day. It would be advantageous to automatically characterize new WiFi networks and make them available to users. The process of detecting new WiFi networks is referred to herein as discovery.

WiFi network recovery and discovery entails establishing a WiFi access point handshake. This process may also be referred to herein as probing. A WiFi access point handshake entails associating with a WiFi access point, which is a process that consumes a lot of power at a client device.

Accordingly, there is a need for improved techniques for establishing WiFi access point handshake priorities.

SUMMARY OF THE INVENTION

A server has a processor and a memory connected to the processor. The memory stores instructions executed by the processor to collect scan lists from client devices. Each scan list includes individual entries. Each individual entry specifies a WiFi access point network identifier collected by a client. WiFi access point networks in the scan lists are evaluated. WiFi access point handshake priorities are supplied to the client devices. The WiFi access point handshake priorities characterize WiFi access point recovery and discovery priorities.

A client device has a processor and a memory connected to the processor. The memory stores instructions executed by the processor to supply a scan list to a server. The scan list includes individual entries, where each individual entry specifies a WiFi access point network identifier. WiFi access point handshake priorities are received. The WiFi access point handshake priorities characterize Win access point recovery and discovery priorities. A first WiFi access point handshake is initiated in accordance with the WiFi access point handshake priorities. A pause is enforced for a designated time period. A second WiFi access point handshake is then initiated in accordance with the WiFi access point handshake priorities.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
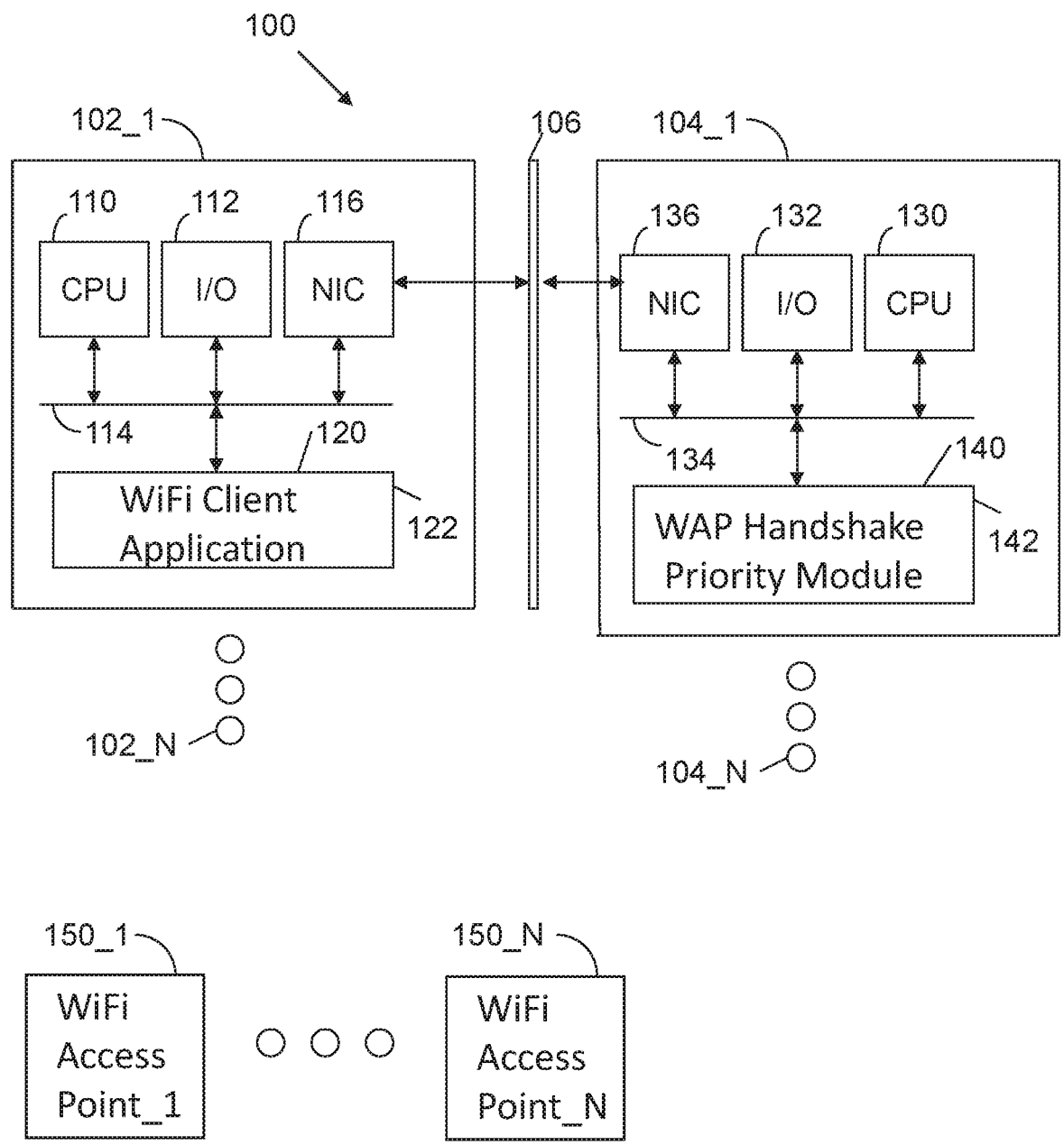
FIG. 1 is a system configured in accordance with an embodiment of the invention.

FIG. 1 illustrates a system 100 configured in accordance with an embodiment of the invention. The system 100 includes a set of client devices 102_1 through 102_N connected to a set of servers 104_1 through 104_N via a network 106, which may be any combination of wired and wireless networks.

Each client device (e.g., client device 102_1) includes a central processing unit 112 connected to input/output devices 112 via a bus 114. The input/output devices 112 may include a keyboard, mouse, touch display and the like. A network interface circuit 116 is also connected to the bus 114 and provides connectivity to network 106. A memory 120 is also connected to the bus 114. The memory 120 stores instructions executed by the central processing unit 110. In particular, the memory 120 stores a WiFi client application 122 to implement operations disclosed herein. The client device 102_1 may be a computer, tablet, mobile phone, wearable device, game console and the like.

Each server (e.g., server 104_1) also includes a central processing unit 130, input/output devices 132, bus 134 and network interface circuit 136. A memory 140 is connected to the bus 134. The memory 140 stores instructions executed by the central processing unit 130. In particular, the memory 140 stores a WAP handshake priority module 142. As its name implies, this module is configured to supply WAP handshake priority information to the WiFi client application 122.

Each client device may use its network interface circuit 116 to make WiFi connections to different WiFi access points 150_1 through 150_N. The WiFi client application 122 sends WAP network information to the WAP handshake priority module 142. That is, each WiFi access point 150_1 through 150_N broadcasts information specifying a name of a network to which it belongs this information may be referred to as a WiFi access point network identifier. Each client device supplies this information to the WAY handshake priority module 142 for evaluation.

Figure 2:
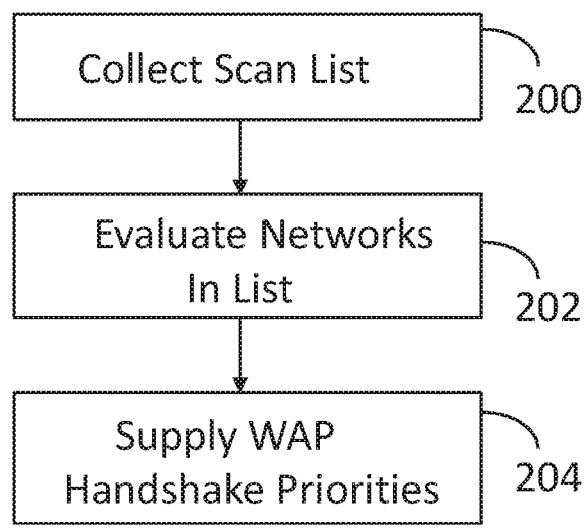
FIG. 2 illustrates processing operations associated with the WAP handshake priority module.

FIG. 2 illustrates processing operations associated with an embodiment of the WAP handshake priority module 142. Initially, scan lists are collected 300. The scan lists are collected from client devices 102_1 through 102_N via network 106. Each scan list includes individual entries. Each individual entry specifies a network name of a. WiFi access point observed by a client device.

The networks in the list are evaluated 202. More particularly, the networks in the list are evaluated for networks that are candidates for recovery and discovery. WAP handshake priorities are then supplied 204. That is, the WAP handshake priority module 142 generates information that is used by a client device to selectively establish handshakes with available WAPs in a manner that is power efficient and is optimized for efficient recovery and discovery of WAPs. The information may be direct instructions for a proposed sequence of WAP handshakes. Alternately, the information may be criteria that allows the WiFi client application 122 to derive an appropriate sequence of WAP handshakes.

The WAP handshake priorities may be in the form of an outgoing_probe_list.

In this embodiment, the WAP handshake priority module 142 maintains a counter for each (SSID, BSSID) pair. SSID is a Service Set Identifier for a WAP, BSSID is a Basic Service Set Identifier or MAC address for a WAP. In one embodiment, this counter is driven using a configurable sequence, such as a Fibonacci sequence, Every time a client device performs a probe query, the counter for that (SSID, BSSID) pair is incremented. After the increment, if the value of the counter is one of the numbers in the Fibonacci sequence, then that networks is included in the outgoing_probe_list. The steps are summarized below:

1. On receiving a probe_query WAP handshake priority module 142 increments counters for each (SSID, BSSID) in the probe_query.
2. If the counter falls on the Fibonacci sequence it is added to the outgoing_probe_list: Fibonacci sequence: 1, 1, 2, 3, 5, 8, 1.3, 21, . . . .
3. Each (SSID) is also marked with recovery/discovery and the index of the counter from the Fibonacci sequence. This step is particularly important if the size of the DNS packet which is used to send the response is kept. Instead of sending the actual counter value, only the Fibonacci sequence index is sent back. The WiFi client application 122 uses this value to sort the probe list.

When the WiFi client application 122 receives the probe response, it sorts the probe_list using the recovery/discovery flag and the corresponding counter value. After sorting, the WiFi access point handshake priority sorted list may look like:

| (SSID1, BSSID1) | Recovery |
| (SSID2, BSSID2) | Recovery |
| (SSID3, BSSID3) | Recovery |
| (SSID4, BSSID4) | Discovery |
| . . . | . . . |

Once this list is prepared, WiFi client application 122 probes one SSID at a time, giving 30 seconds idle time between each probe. That is, after a probe finishes, if no connection is triggered and user is idle, then it picks the next networks in the probe list for probing. At any time if there is a WiFi network that can be connected, then the probe is suspended. That is, the probing is stopped with a 30 seconds idle timeout; it follows the rule above to resume the probe after a 30 second time period elapses. If a WiFi network gets connected, then probing is suspended until a next network change event. On the next network change event, the foregoing probing rules are applied.

Figure 3:
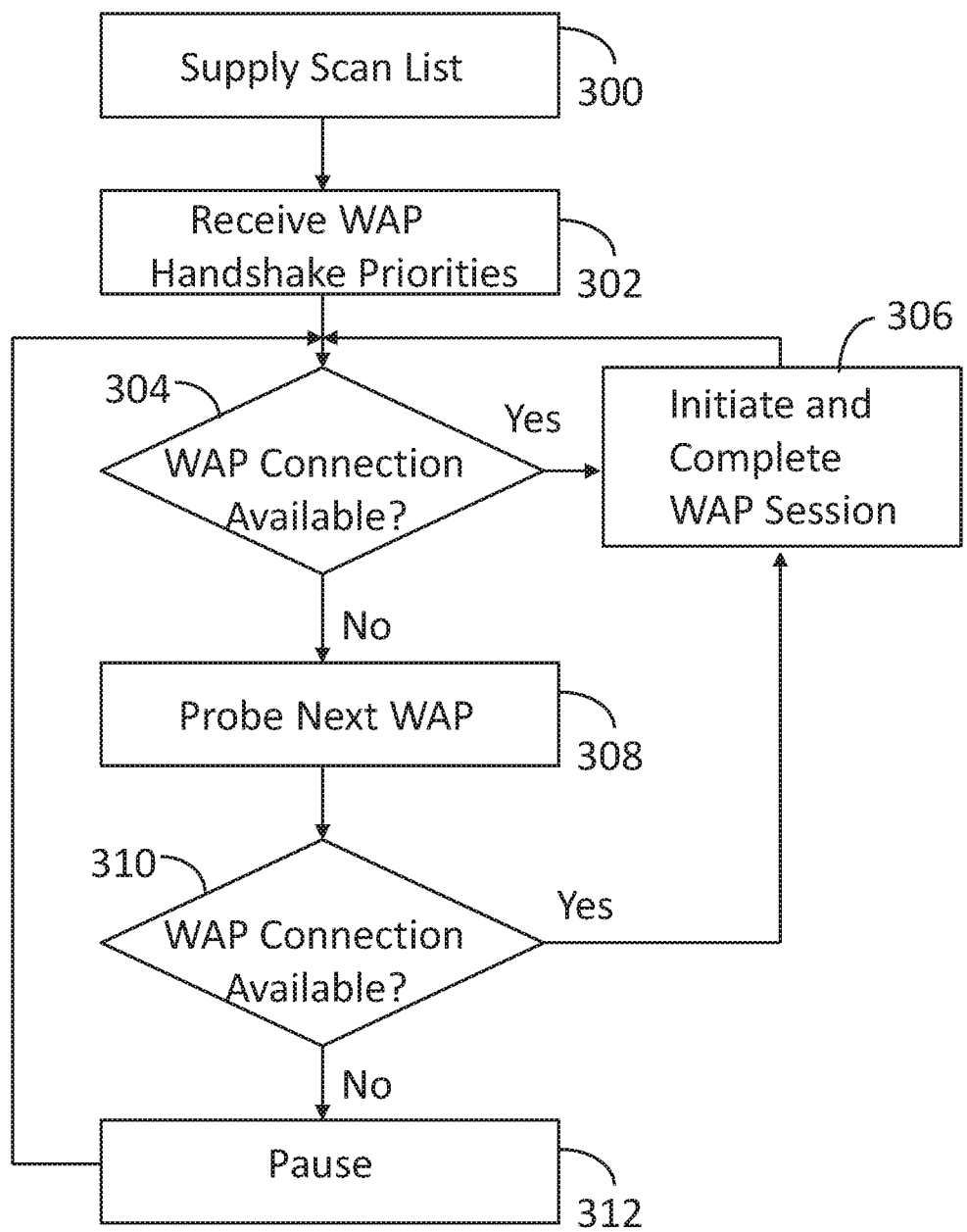
FIG. 3 illustrates processing operations associated with the WiFi client application 122.

The foregoing processing by the WiFi client application 112 is characterized in FIG. 3, The WiFi client application 112 supplies a scan list 300 to a server 104. It then receives WAP handshake priorities 302. The received WAP handshake priority may, be in the form of a WiFi access point handshake priority sorted list or a set of information that allows the WiFi client application 112 to form a WiFi access point handshake priority sorted list.

It is then determined whether a WAP connection is available 304. Observe that WAP connections are prioritized over probe activity. If a WAP connection is available (304—Yes), a WAP session is initiated and completed 306. Control then returns to block 304. If a WAP connection is not available (304—No), the next WAP in the WiFi access point handshake priority list is probed 308. It is then determined if a WAP connection is available 310. If so (310—Yes), control returns to block 306 and then block 304. If not (310—No), then a pause 312 is enforced (e.g., 30 seconds) before control returns to block 304.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A client device, comprising:
 a processor; and
 a memory connected to the processor, the memory storing instructions executed by the processor to:
  supply a scan list to a server, wherein the scan list includes individual entries, wherein each individual entry specifies a WiFi access point network identifier,
  receive WiFi access point handshake priorities, wherein the WiFi access point handshake priorities characterize a sequence for associating the client device with selected WiFi access points, wherein the sequence is based upon WiFi access point recovery priorities and WiFi access point discovery priorities, wherein the WiFi access point recovery priorities characterize WiFi access points returning to service and the WiFi access point discovery priorities characterize newly detected WiFi access points, wherein the WiFi access point handshake priorities are used by the client device to selectively establish handshakes with available WiFi access points in a manner that is power efficient and is optimized for efficient recovery and discovery of WiFi access points, and initiate a first WiFi access point handshake in accordance with the WiFi access point handshake priorities, pause for a designated time period, and initiate a second WiFi access point handshake in accordance with the WiFi access point handshake priorities.

2. The client device of claim 1 further comprising instructions executed by the processor to determine whether a WiFi access point connection is available prior to executing the instructions to initiate the first WiFi access point handshake.

3. The client device of claim 1 further comprising instructions executed by the processor to determine whether a WiFi access point connection is available prior to executing the instructions to pause for the designated time period.

4. The client device of claim 1 further comprising instructions executed by the processor to sort the WiFi access point handshake priorities into a WiFi access point handshake priority sorted list.

\* \* \* \* \*